United States Patent [19]

Lind

[11] 4,406,446
[45] Sep. 27, 1983

[54] MODEL AIRCRAFT COVERING TOOL

[76] Inventor: Eldon J. Lind, 2912 Walker Lee Dr., Los Alamitos, Calif. 90720

[21] Appl. No.: 260,371

[22] Filed: May 4, 1981

[51] Int. Cl.³ .............................................. B25B 1/00
[52] U.S. Cl. .................................... 269/152; 269/909
[58] Field of Search ................ 269/54, 152, 252, 104, 269/909, 166; 38/102, 102.1, 102.4, 102.9, 102.91; 160/327–329

[56] References Cited

U.S. PATENT DOCUMENTS

| | | | |
|---|---|---|---|
| 3,353,578 | 11/1967 | Kalkanis | 269/54 |
| 3,386,727 | 6/1968 | Lind | 269/152 |
| 3,510,118 | 5/1970 | Brechtel | 269/104 |
| 3,553,862 | 1/1971 | Hamu | 38/102.1 |
| 3,601,353 | 8/1971 | Dale | 160/327 |

*Primary Examiner*—Robert C. Watson
*Attorney, Agent, or Firm*—William C. Babcock

[57] ABSTRACT

A substantially all wood, lightweight, inexpensive tool that includes two elongate laterally adjustable base members that have longitudinal slots therein that are removably engageable by dowels to grip marginal edge portions of a sheet covering material therebetween. The span of covering material extending between the base members may be coverite, silk, monokote, solar film, silk span tissue, ¾ inch fiberglass or the like. The tool when so containing the covering material is caused to overlie a wing or other desired portion of a model airplane that rests at a sufficient elevated position on a flat horizontal surface that the base members do not contact the latter; and the weight of the tool tensioning the span of covering material so that the latter extends over the leading and trailing edge of the wing. The span of covering material may be heat sealed or otherwise secured to the wing or model aircraft component. During the covering operation the span of covering material need not be separated from a roll or large sheet thereof. The span of covering material used may be separated from the roll or large sheet thereof after the covering operation is completed using the base members as straight edges to guide the knife or cutting tool.

1 Claim, 7 Drawing Figures

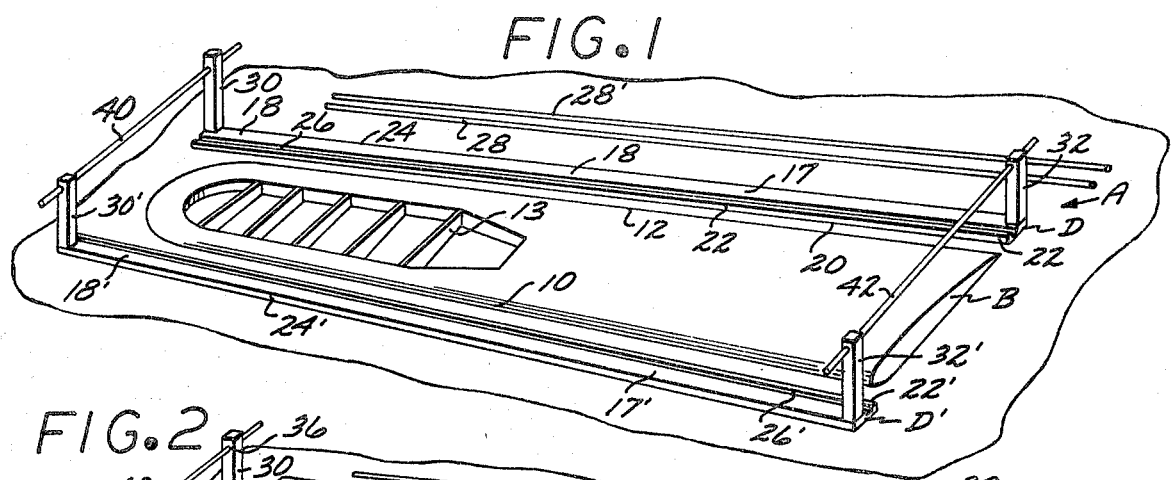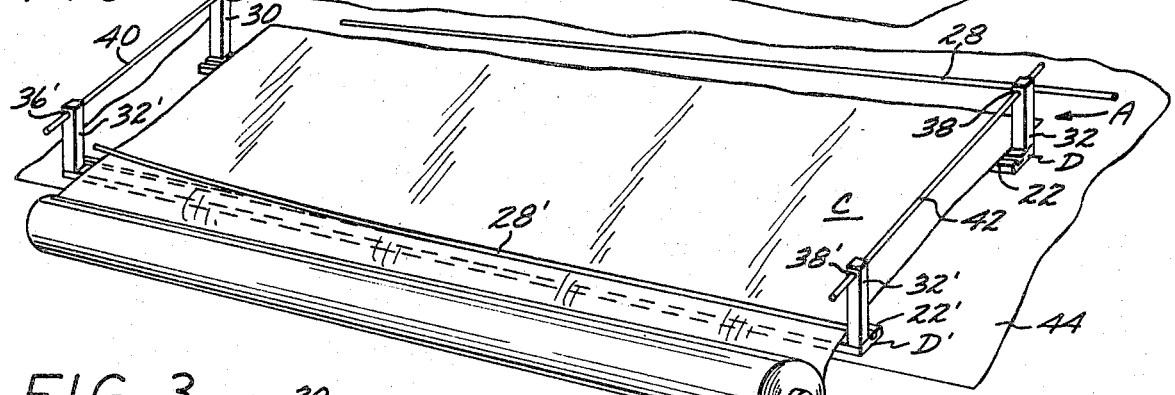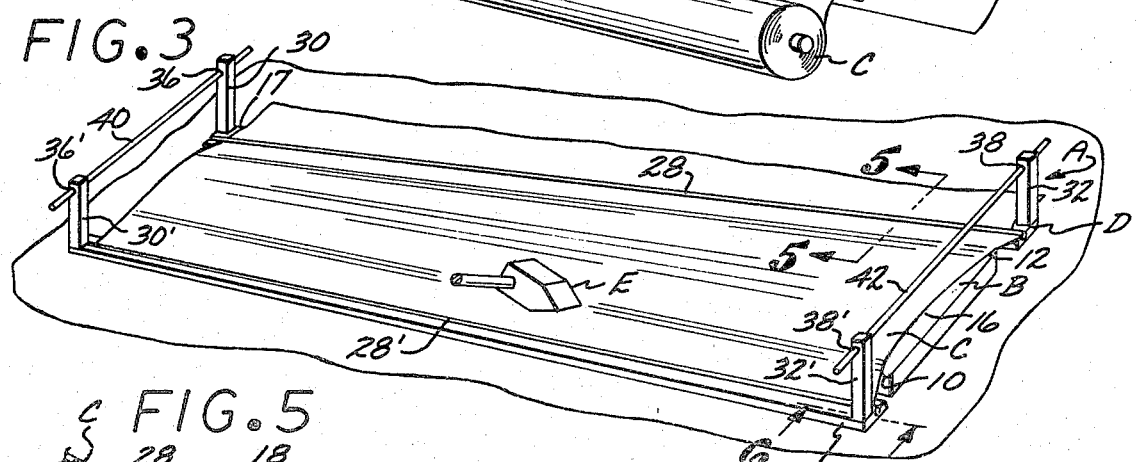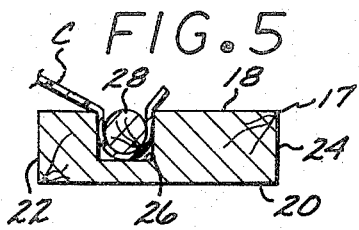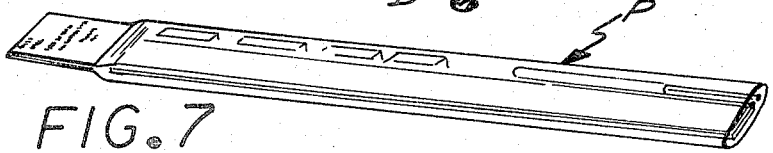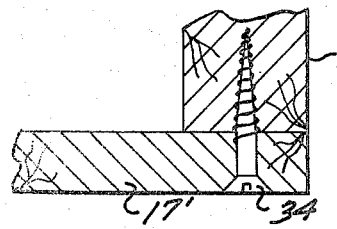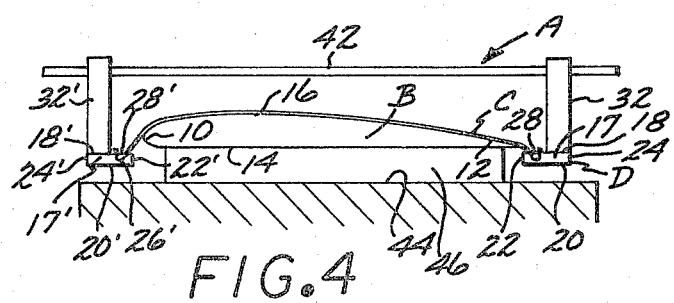

MODEL AIRCRAFT COVERING TOOL

BACKGROUND OF THE INVENTION

1. Field of the Invention

Model Aircraft Covering Tool.

2. Description of the Prior Art

In the building of model aircraft, it is common practice to form the wings from a hollow frame work or skeleton of light weight rigid material such as balsa wood or the like, with the wings subsequently being covered with a sheet of pliable material such as silk, monokote, solar film, silk span, tissue, fiberglass, or the like. The sheet covering material after being placed in taut smooth contact with the framework of the model aircraft such as the wing, portions of the fuselage or the like is adhered thereto by a suitable adhesive, or heat sealing, or other conventional means.

In the past, various devices have been developed and used to hold the pliable sheet material in a position to cover the wing or other desired component of the model aircraft, an example of which device is the tool disclosed and claimed in U.S. Pat. No. 3,386,727 that issued to applicant on June 4, 1968. Although the device disclosed and claimed in this patent is capable of performing the function of holding a pliable sheet of material in a taut position over a desired component of a model aircraft, it has the disadvantage that it is expensive to produce, bulky and cumbersome to store, and as result has had limited commercial use.

A major object of the present invention is to supply a tool that includes a pair of laterally adjustable base members that have longitudinal dowel receiving slots therein that removably engage marginal edge portions of a span of covering material, which span need not be separated from the roll or longitudinal sheet of which it forms a part, and the tool then disposed to overlie a wing or desired component of a model aircraft that rests at an elevated position on a flat horizontal surface such as a table top or the like, and the base members not contacting the horizontal surface, and as a result the weight of the tool causing the span of covering material to assume a taut condition in which it extends over the trailing and leading edges of the wing to be subsequently secured thereto by heat sealing, adhesives or other conventional means.

Another object of the invention is to supply a tool that is preferably substantially formed from wood, has an extremely simple mechanical structure, has components that are elongate in shape and are capable of being disposed side-by-side in a compact package to occupy a minimum of space prior to the sale thereof, and a tool that may be easily assembled by either a novice or expert model builder in a minimum of time and with a minimum of inconvenience.

Another object of the invention is to supply a model aircraft covering tool that may be retailed in a knockdown condition in a compact package and assembled by a person having a minimum of mechanical skill without difficulty, and the tool when not in use capable of being disassembled to occupy a minimum of storage space until again needed.

Yet another object of the invention is to supply a tool that is laterally adjustable for the particular wing or component of the model aircraft that is to be covered with a sheet of pliable material, and the sheet when in taut condition with a component capable of being not only bonded thereto, but after the bonding operation is complete one or both of the elongate base members that form a part of the invention capable of being used as a straight edge to sever surplus sheet material from the span of material that is in taut covering contact with the wing or component of the aircraft that is disposed between the base members of the invention.

These and other objects and advantages of the invention will become apparent from the following description of a preferred form thereof.

SUMMARY OF THE INVENTION

The invention is a light weight substantially all wood tool that includes a pair of elongate base members, each of which base members has a pair of uprights removably secured thereto, and the uprights capable of being disposed in transverse relationship relative one another. The two pairs of uprights slidably engage two transverse elongate rods that may be used as handles to manipulate the tool during the aircraft covering operation.

The two base members have longitudinal slots formed in the upper surfaces thereof that are frictionally engaged by a pair of elongate dowels. The dowels when disposed in the slots frictionally engage the same and removably grip marginal edge portions of a sheet of covering material, with the span of covering material between the base members being subsequently secured to the wing or desired portion of the model aircraft.

In the covering operation the wing or other desired component of the model aircraft is rested on a book, block of wood or the like that rests on a horizontal surface such as a table top or the like. The tool with the span of material extending between the pair of base members is now overlayed the wing or other desired component of the model aircraft with the base members being disposed above the top of the table or horizontal surface. Consequently, the span of material of the covering material between the uprights is brought into taut pressure contact with the wing or other component of the model aircraft due to the weight of the tool being exerted on the span of covering material. When the span of covering material is thus disposed, it may be adhered to the wing by heat sealing, adhesive or other conventional means. The spacing of the pair of base members is such that the span of material extends over the leading and trailing edge of the wing disposed between the pair of base members. After the span of covering material has been secured to the wing, surplus material may be severed from the span of material adhered to the wing by using a knife or other cutting means that is moved along the base members, which base members serve as a guide for this cutting operation. It will be particularly noted that during the cutting operation the span of pliable material used need not be separated from a larger sheet or roll of which it forms a part, or this separation may take place after the covering operation is complete. In this manner, a minimum of pliable material is used, with the portion not used remaining as an integral part of the sheet or roll.

In the event that the tool is used only infrequently, after the covering operation is completed, the tool may be disassembled and the components all of which are elongate in shape may be stored side-by-side in a compact configuration until again needed. The reassembly of the components is extremely simple and requires a minimum of time, as is true of the tool being disassembled after use.

BRIEF DESCRIPTION OF THE DRAWING

FIG. 1 is a perspective view of the tool after the latter has been assembled, and the base members that form a part thereof having been disposed on opposite sides of the wing or other component of the aircraft that is to be covered with a sheet of pliable material;

FIG. 2 is substantially the same view as shown in FIG. 1 but with the covering material now being secured to the base members by the use of dowels that engage slots therein;

FIG. 3 is a perspective view of the tool after the span of covering material has been disposed in a tension position to cover the wing and extend over the leading and trailing edges thereof, and a heat sealing device being moved longitudinally along the leading edge of the wing to secure the covering material thereto;

FIG. 4 is an end elevational view of the tool illustrating the manner in which the span of covering material is disposed in a taut condition to extend over the wing or other desired component of a model aircraft, with the tensioning of the span of covering material being due to the weight of the tool that exerts a tensioning force thereon;

FIG. 5 is a fragmentary transverse cross-sectional view of one of the elongate base members that has a slot therein removably engaged by a dowel, and the dowel and slot cooperating to removably engage a marginal edge portion of the span of covering material, with the view being taken on the line 5—5 of FIG. 3;

FIG. 6 is a fragmentary vertical cross-sectional view of a base member and upright taken on the line 6—6 of FIG. 3 and illustrating the manner in which the uprights are removably secured to the base members; and FIG. 7 is a perspective view of the invention disassembled and packaged to occupy a minimum of space.

DESCRIPTION OF THE PREFERRED EMBODIMENT

The model aircraft covering tool A is shown disassembled in a package P in FIG. 7 in which it occupies a minimum of space either prior to sale or after it has been used and is being stored. The tool A is substantially formed of wood such as pine or the like.

The tool A is shown assembled in FIG. 1 in a position in which a component B of a model aircraft, such as a wing, may have a sheet C of a pliable material such as silk, monokote, coverite, solarfilm, silkspan, tissue or ¾ ounce fiberglass extended in a taut condition thereacross and adhered thereto.

The component B is illustrated in the drawing as a wing section of a model aircraft that has a leading edge portion 10, trailing edge portion 12, and a number of spaced transverse spars 13 that extend therebetween. The wing section B has a bottom surface 14 and upper surface 16 that cooperate with the leading and trailing edge portions to define an air foil. The component B may equally well be a rudder, stabilizer or other part of a model aircraft that is to be covered with the sheet material C.

The tool A as may be seen in FIG. 1 includes first and second base member assemblies D and D', that are identical in structure, and accordingly only the assembly D will be described in detail. First base member assembly D includes an elongate wood strip of greater length than the component B that is to be covered with the sheet material C. Strip 17 is preferably formed from wood and includes a flat top surface 18, flat bottom surface 20, and first and second longitudinal side surfaces 22 and 24. Strip 17 as best seen in FIG. 5 has a longitudinal slot 26 of substantially square transverse cross-section that extends downwardly from the top surface 18 thereof and is located adjacent the first longitudinal side surface 22. First slot 26 may be snugly and frictionally engaged by an elongate first dowel 28 as also shown in FIG. 5.

The first elongate strip 17 has first and second uprights 30 and 32 secured to end portions thereof by screws 34 as shown in detail in FIG. 6, and the uprights 30 and 32 being further illustrated in the balance of the figures in the drawing. The uprights 30 and 32 are secured to the strip 16 by screws 34 to permit the uprights to swivel on the strip 17 if the wing section B is of longitudinal tapered structure. First and second uprights 30 and 32 have first and second transverse openings 36 and 38 formed therein as shown in FIGS. 1 to 4 inclusive. Second base member assembly D' has the same components as first base member D, and these components being identified on the drawing by the same numerals previously used but with primes being added thereto. After the first and second base member assemblies D and D' have bene put together, first and second rods 40 and 42 that may serve as handles are extended through the first and second pairs of openings 36, 36' and 38, 38' as shown in the drawings to provide the covering tool A illustrated in FIG. 1.

After the tool A has been assembled as shown in FIG. 1, the component B to be covered is initially placed on a flat horizontal surface 44, such as a table top, and the base members D and D' are adjusted on the first and second rods 40 and 42 so that the base members are one half to one inch from the longitudinal sides of the component B that is to be covered.

A span of the sheet material C is now extended between the base members D and D', with marginal edge portions thereof being gripped by the first and second dowels 28 and 28' as the latter are pressed downwardly into the first and second slots 26 and 26'.

The span of sheet material C need not be separated at this stage from a large sheet or roll C' thereof as shown in FIG. 2. After the above described operation is completed, the component B is caused to rest on a block or book 46 that is supported on the flat surface 44 as shown in FIG. 4. The tool A that is loaded with sheet material C is now disposed as shown in FIG. 4, with the span of sheet material therein being of sufficient width that it extends below the leading and trailing edge portions 10 and 12.

In FIG. 4 it will be noted that the first and second base member assemblies D and D' are above the surface 44, and the span of sheet material C is transversely tensioned over the component B due to the weight of the tool A. The sheet material C may now be adhered to the component by use of dope, resin, or by being ironed on by use of a conventional heated element E as illustrated in FIG. 3. In the event it is desired to transversely tension the span of sheet material C to a greater extent than accrues from the use of the weight of the tool A, the weight of the tool may be increased by securing stick-on wheel balance weights (not shown), which weights are available in auto parts stores.

After the covering operation is completed the span of sheet material C may be separated from the roll C' or large sheet thereof by a knife (not shown), using the strip 17' illustrated in FIG. 2 as a straight edge.

The sequence of operations in the application of sheet C to a component B is fully illustrated in the drawings. In FIG. 1 the tool A is illustrated after being assembled from the components in the package P shown in FIG. 7. FIG. 2 shows a span of sheet material C being secured to the first and second base member assemblies D and D'. In FIG. 4 the tool A is shown holding the span of sheet material C in a taut covering position on the wing section B. FIG. 3 illustrates the sheet material C being bonded to the wing section B by use of a heating element E of conventional design.

The use and operation of the invention has been described previously in detail and need not be repeated.

What is claimed is:

1. A tool comprising a plurality of elongate components which when marketed or not in use may be disposed side by side in parallel relationship to occupy a minimum of space, said tool when assembled capable of removably supporting a rectangular end section of a sheet of pliable material from a roll thereof in a taut condition to cover the upper surface of a wing of a model airplane when said wing is supported at an elevated position, and wing having leading and trailing edges, said tool including:

a. first and second rigid strips of greater lengths than said wing disposed outwardly from said leading and trailing edges and substantially parallel to one another, said first and second rigid strips having flat upper surfaces in which longitudinal grooves are defined and over which said end section extends;

b. first and second pairs of uprights that extends upwardly from said upper surfaces of said first and second strips, adjacent said ends thereof, said first and second pair of uprights having axially aligned transverse openings therein;

c. means for removably securing said first and second pairs of uprights to said first and second strips;

d. first and second rods that removably engage said first and second pairs of openings to permit said first and second pairs of uprights and strips to be raised and lowered as a unit relative to said wing; and e. first and second dowels of slightly smaller transverse cross section than that of said grooves that press transverse parts of said end section of said sheet material downwardly into said grooves to frictionally engage the latter, with said end section of said sheet material between said first and second strips overlying said top surface and being held in a taut condition by gravity due to the weight of said tool, with said end section of said sheet material when so disposed capable of being adhered to said top surface after which said end section is severed from said roll.

* * * * *